: US 10,637,698 B1
(12) United States Patent
Wang

(45) Date of Patent: Apr. 28, 2020

(54) SYSTEM AND METHOD FOR DEMODULATING FREQUENCY SHIFT KEYING SIGNAL

(71) Applicant: ANPEC ELECTRONICS CORPORATION, Hsinchu (TW)

(72) Inventor: Yuan-Hung Wang, Miaoli County (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 16/451,047

(22) Filed: Jun. 25, 2019

(30) Foreign Application Priority Data

Mar. 11, 2019 (TW) .............................. 108108039 A

(51) Int. Cl.
*H04L 27/14* (2006.01)
*H02J 7/02* (2016.01)
*H02J 50/10* (2016.01)

(52) U.S. Cl.
CPC .............. *H04L 27/14* (2013.01); *H02J 7/025* (2013.01); *H02J 50/10* (2016.02)

(58) Field of Classification Search
CPC .. H04L 27/14; H04L 27/1563; H02M 3/1588; H02M 1/38; H02M 3/538; H03K 3/156; H03K 2217/0036; H03K 3/1588

USPC ......................................................... 375/334
See application file for complete search history.

(56) References Cited

U.S. PATENT DOCUMENTS

2017/0358979 A1 * 12/2017 Lam ......................... H02M 1/00
2019/0181697 A1 *  6/2019 Malkin ................... H02J 50/80
2019/0393734 A1 * 12/2019 Zhou ....................... H02J 7/025

* cited by examiner

*Primary Examiner* — Khai Tran
(74) *Attorney, Agent, or Firm* — Li & Cai Intellectual Property (USA) Office

(57) ABSTRACT

A system and a method for demodulating a frequency shift keying signal are provided. The system includes a power transmitter and a power receiver. The power transmitter generates a frequency shift keying signal including a power signal and a power modulation instruction message. The power receiver detects a non-modulation period of the power signal within a waiting time, and then modulates a frequency of the power signal according to the power modulation instruction message to generate a pulse width modulated signal. The power receiver then calculates a full period of the pulse width modulated signal and then subtracts the non-modulation period from the full period of the pulse width modulated signal to obtain an undemodulated signal.

9 Claims, 7 Drawing Sheets

SYSTEM AND METHOD FOR DEMODULATING FREQUENCY SHIFT KEYING SIGNAL

CROSS-REFERENCE TO RELATED PATENT APPLICATION

This application claims the benefit of priority to Taiwan Patent Application No. 108108039, filed on Mar. 11, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a demodulating system and method, and more particularly to a system and a method for demodulating a frequency shift keying signal.

BACKGROUND OF THE DISCLOSURE

In the past decade, various mobile/portable devices have been developed and produced in large quantities. For example, the use of mobile phones, tablet computers, media players and the like has become ubiquitous. Such devices are often powered by internal secondary batteries thereof, but the internal secondary batteries need to be recharged subsequently. Alternatively, such devices are directly connected to an external power supply device and powered by the external power supply device.

While most of the mobile/portable devices need to be electrically connected to or contacted with an external power supply device and powered by the external power supply device, this requirement is often impractical.

The mobile/portable device is in electric contact with the external power supply device via a connector physically inserted into the mobile/portable device and the external power supply device by a user or in other manners. Under this condition, a long wire is often required, which is often inconvenient for users. Most of the mobile/portable devices are configured with dedicated power supply devices for different power requirement. Therefore, the user must own different dedicated power supply devices for specific mobile/portable devices. The used mobile/portable devices may be powered by the internal secondary batteries thereof without wire connection between the mobile/portable device and the power supply device, but this solution still has significant disadvantages. For example, the damaged internal secondary battery needs to be recharged or replaced with an expensive new one. The internal secondary battery provided in the mobile/portable device may also greatly increase the weight of the device, and potentially increasing cost and size.

A wireless power supply device has been used for the mobile/portable device so that user experience is significantly improved. When a transmitter coil of a power transmitter device senses a magnetic field on receiver coils of power receiver devices, the power may be transmitted respectively to the receiver coils from the transmitter coil. Power delivery by magnetic induction is a well-known concept that is mainly used in transformers and has a tight coupling between a primary transmitter coil and a secondary receiver coil. The primary transmitter coil and the secondary receiver coil are spaced from and electromagnetically coupled with each other. In this way, the power transmission between them can be carried out based on electromagnetic coupling principle of the transformer.

Such configuration allows power to be transmitted between the mobile/portable device and the power supply device without wire connection or other physical electrical connection. In practice, the mobile/portable device may be placed at a position located near or on the transmitter coil so as to be recharged or powered by the transmitter coil.

Furthermore, in the above-mentioned wireless power transmission configuration, the power transmitter device may be designed to be applicable for different types of power receiver devices. More specifically, a wireless power transmission standard such as a Qi standard has been defined and is currently being developed. The power transmitter device that conforms to the Qi standard can be used for the power receiver that conforms to the Qi standard, without the need for the power transmitter device and the power receiver being made by the same manufacturer or dedicated to each other. The power transmitter device has a function of supplying appropriate power to the power receiver, for example, according to specific power consumption, based on Qi standard.

SUMMARY OF THE DISCLOSURE

In response to the above-referenced technical inadequacies, the present disclosure provides a system for demodulating a frequency shift keying signal. The system includes a power transmitter and a power receiver. The power transmitter includes a power signal generator and a power transmitter inductor. The power signal generator is configured to generate the frequency shift keying signal including a power signal and a power modulation instruction message. The power transmitter inductor is connected to the power signal generator. The power transmitter inductor is configured to transmit the frequency shift keying signal from the power signal generator. The power receiver is connected to the power transmitter, and includes a power receiver inductor and a power modulation signal generator. The power receiver inductor is coupled to the power transmitter inductor. The power receiver inductor is configured to receive the frequency shift keying signal and respond a power modulation response signal to the power transmitter inductor within a waiting time after receiving the frequency shift keying signal. The power modulation signal generator includes a non-modulation period detector, a power signal modulator, a full period calculator and an undemodulated signal. The non-modulation period detector is connected to the power receiver inductor and configured to detect a non-modulation period of the power signal received by the power receiver inductor within a sampling time. The power signal modulator is connected to the power receiver inductor and configured to modulate the power signal according to the power modulation instruction message to generate a pulse width modulated signal. The full period calculator is connected to the power signal modulator and configured to calculate a full period of the pulse width modulated signal. The undemodulated signal generator is connected to the full period calculator and the non-modulation period detector. The undemodulated signal generator is configured to subtract the non-modulation period from the full period of the pulse width modulated signal to generate an undemodulated signal.

In addition, the present disclosure provides a method for demodulating a frequency shift keying signal. The method includes the following steps: generating the frequency shift keying signal including a power signal and a power modulation instruction message by a power signal generator of a power transmitter; transmitting the frequency shift keying signal received from the power signal generator by a power transmitter inductor of the power transmitter; receiving the frequency shift keying signal by a power receiver inductor of a power receiver; detecting a non-modulation period of the power signal received by the power receiver inductor within a sampling time by a non-modulation period detector of the power receiver; modulating the power signal according to the power modulation instruction message to generate a pulse width modulated signal by a power signal modulator of the power receiver; calculating a full period of the pulse width modulated signal by a full period calculator of the power receiver; and subtracting the non-modulation period from the full period of the pulse width modulated signal to generate an undemodulated signal by an undemodulated signal generator of the power receiver.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
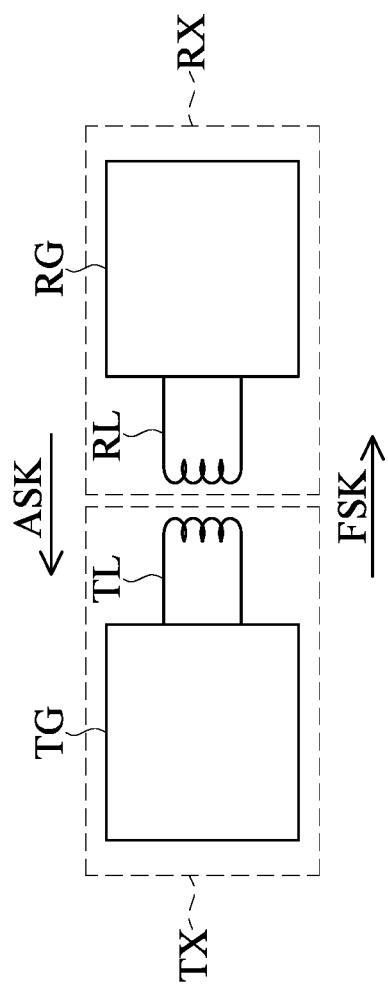
FIG. 1 is a circuit layout diagram of a power transmitter and a power receiver of a system for demodulating a frequency shift keying signal according to embodiments of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
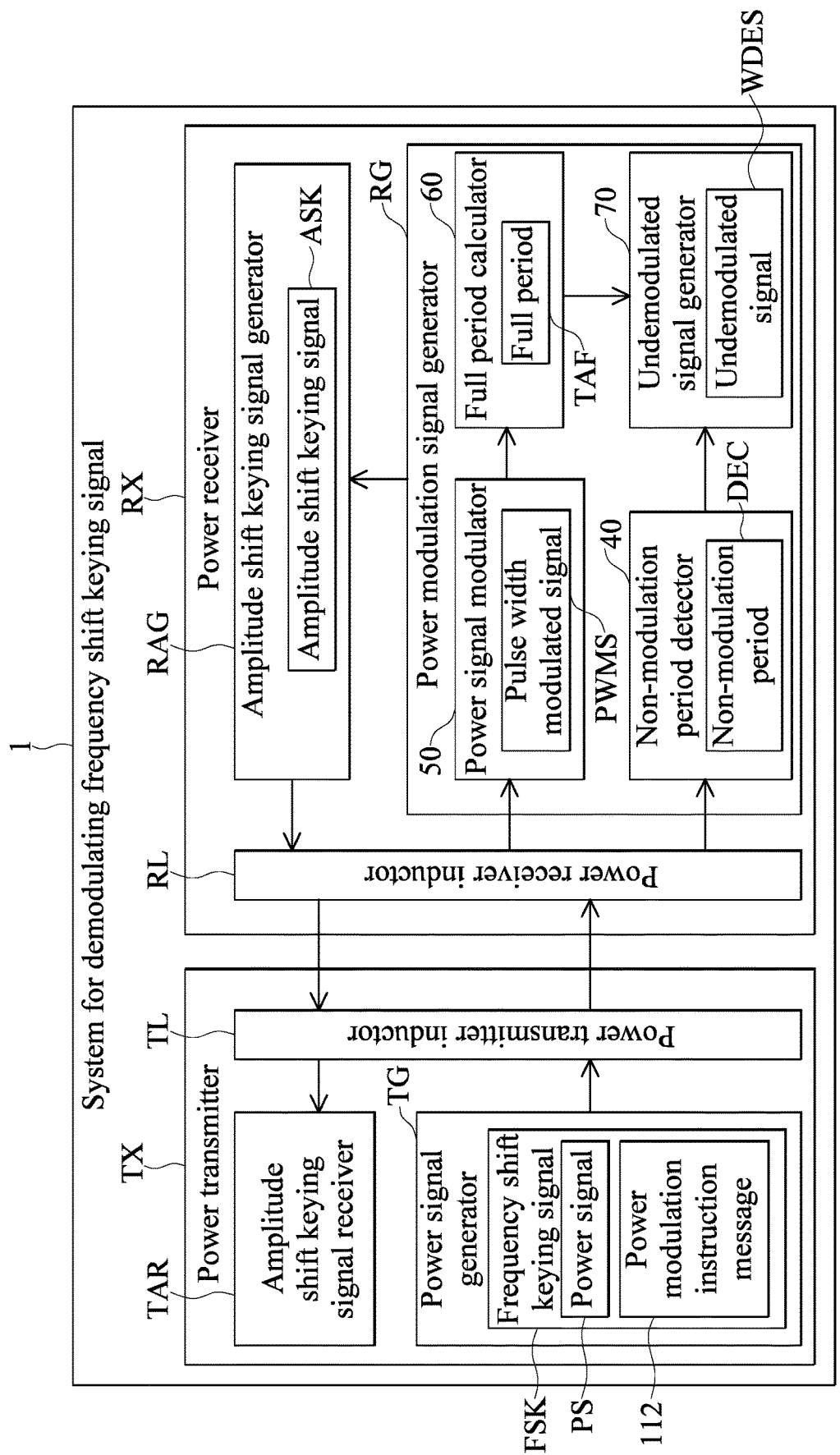
FIG. 2 is a detailed circuit diagram of the system for demodulating the frequency shift keying signal according to a first embodiment of the present disclosure.

Reference is made to FIGS. 1 and 2, wherein FIG. 1 is a circuit layout diagram of a power transmitter and a power receiver of a system for demodulating a frequency shift keying signal according to embodiments of the present disclosure, and FIG. 2 is a detailed circuit diagram of the system for demodulating the frequency shift keying signal according to a first embodiment of the present disclosure.

As shown in FIGS. 1 and 2, a system 1 for demodulating the frequency shift keying signal (FSK) includes a power transmitter TX and a power receiver RX. The power transmitter TX includes a power signal generator TG; a power transmitter inductor TL and an amplitude shift keying (ASK) signal receiver TAR. The power transmitter inductor TL is connected to the power signal generator TG.

The power receiver RX includes a power receiver inductor RL, a power modulation signal generator RG and an amplitude shift keying signal generator RAG The power receiver inductor RL is connected to the power modulation signal generator RG The power transmitter inductor TL and the power receiver inductor RL may be coil windings having an inductive property. The power transmitter inductor TL of power transmitter TX is electromagnetically coupled to the power receiver inductor RL of the power receiver RX.

A magnetic field may be generated between the power transmitter inductor TL of the power transmitter TX and the power receiver inductor RL of the power receiver RX. Under this condition, a power signal can be transmitted between the power signal generator TG and the power modulation signal generator RG The power signal generator TG transmits power to the power modulation signal generator RG by a frequency shift keying signal FSK.

As shown in FIG. 2, the power modulation signal generator RG of the power receiver RX may include a non-modulation period detector 40, a power signal modulator 50, a full period calculator 60 and an undemodulated signal generator 70. The power receiver inductor RL is connected to the non-modulation period detector 40 and the power signal modulator 50. The power signal modulator 50 is connected to the full period calculator 60. The undemodulated signal generator 70 is connected to the non-modulation period detector 40 and the full period calculator 60.

Firstly, the power signal generator TG of the power transmitter TX is configured to generate the frequency shift keying signal FSK. The frequency shift keying signal FSK includes a power signal PS and a power modulation instruction message 112. The power modulation instruction message 112 includes a frequency, a pulse width, a period, a power value, and so on of the modulated power signal PS. The power transmitter inductor TL of the power transmitter TX is configured to receive the frequency shift keying signal FSK and transmit the received frequency shift keying signal FSK to the power receiver RX.

The power receiver inductor RL of the power receiver RX senses the magnetic field on the power transmitter inductor TL of the power transmitter TX and receives the frequency shift keying signal FSK from the power transmitter inductor TL. The power receiver inductor RL transmits the frequency shift keying signal FSK to the non-modulation period detector 40 and the power signal modulator 50 of the modulation signal generator RG of the power receiver RX.

Figure 4:
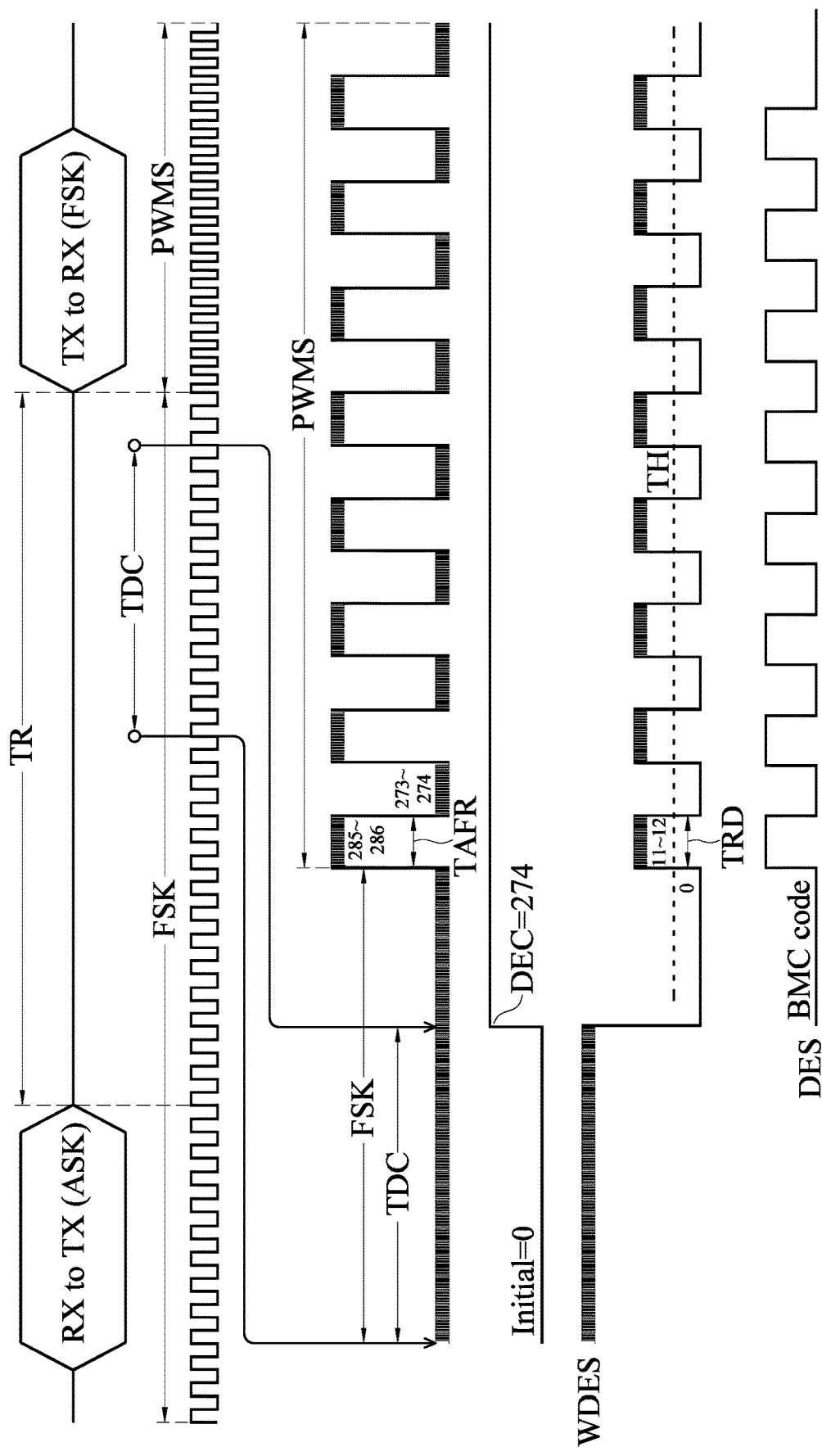
FIG. 4 is a signal waveform diagram of the system for demodulating the frequency shift keying signal according to a third embodiment of the present disclosure.

It should be understood that a waiting time such as a waiting time TR shown in FIG. 4 is required for signal transmission between the power receiver inductor RL of the power receiver RX and the power transmitter inductor TL of the power transmitter TX. For example, the power receiver RX transmits an amplitude shift keying signal ASK including a message to the power transmitter TX. The amplitude shift keying signal receiver TAR decodes the amplitude shift keying signal ASK. After the power receiver RX waits for the waiting time, the amplitude shift keying signal receiver TAR responds the frequency shift keying signal FSK including information to the power receiver RX. For example, the power receiver RX transmits a message to the power transmitter TX through the amplitude shift key signal ASK. At this time, the amplitude shift keying signal receiver TAR decodes the amplitude shift keying signal ASK, and must respond to the information of the power receiver RX through the frequency shift keying signal FSK after a waiting time.

It is worth noting that, in the embodiment, the non-modulation period detector 40 of the power receiver RX is configured to detect a non-modulation period DEC of the power signal PS received by the power receiver inductor RL within a sampling time included in the waiting time. The non-modulation period detector 40 then outputs the detected non-modulation period DEC to the undemodulated signal generator 70 of the power receiver RX. The power signal PS may comply with Qi standard developed by a Wireless Power Consortium. In the embodiment, the non-modulation period DEC is a non-modulation period of the power signal PS within a sampling time TDC.

On the other hand, the power signal modulator 50 of the power receiver RX is configured to modulate a frequency of the power signal PS according to the power modulation instruction message 112 to generate a pulse width modulated signal PWMS. After the power signal PS is modulated by the power signal modulator 50 of the power receiver RX, the full period calculator 60 of the power receiver RX may receive the pulse width modulated signal PWMS from the power signal modulator 50. The full period calculator 60 then calculates a full period TAF of pulse waves of the pulse width modulated signal PWMS and then outputs the pulse width modulated signal PWMS and the detected full period TAF thereof to the undemodulated signal generator 70.

Further, the undemodulated signal generator 70 receives the non-modulation period DEC of the power signal PS from the non-modulation period detector 40. The undemodulated signal generator 70 receives the pulse width modulated signal PWMS that is modulated from the power signal PS to have the full period TAF from the full period calculator 60. The undemodulated signal generator 70 then subtracts the non-modulation period DEC from the full period TAF of the pulse width modulated signal PWMS to generate an undemodulated signal WDES.

The undemodulated signal generator 70 of the power modulation signal generator RG may output the undemodulated signal WDES to the amplitude shift keying signal generator RAG The undemodulated signal WDES may be decoded to generate a demodulated signal by a decoder included in the amplitude shift keying signal generator RAG or an additional element having a decoding function.

Figure 3:
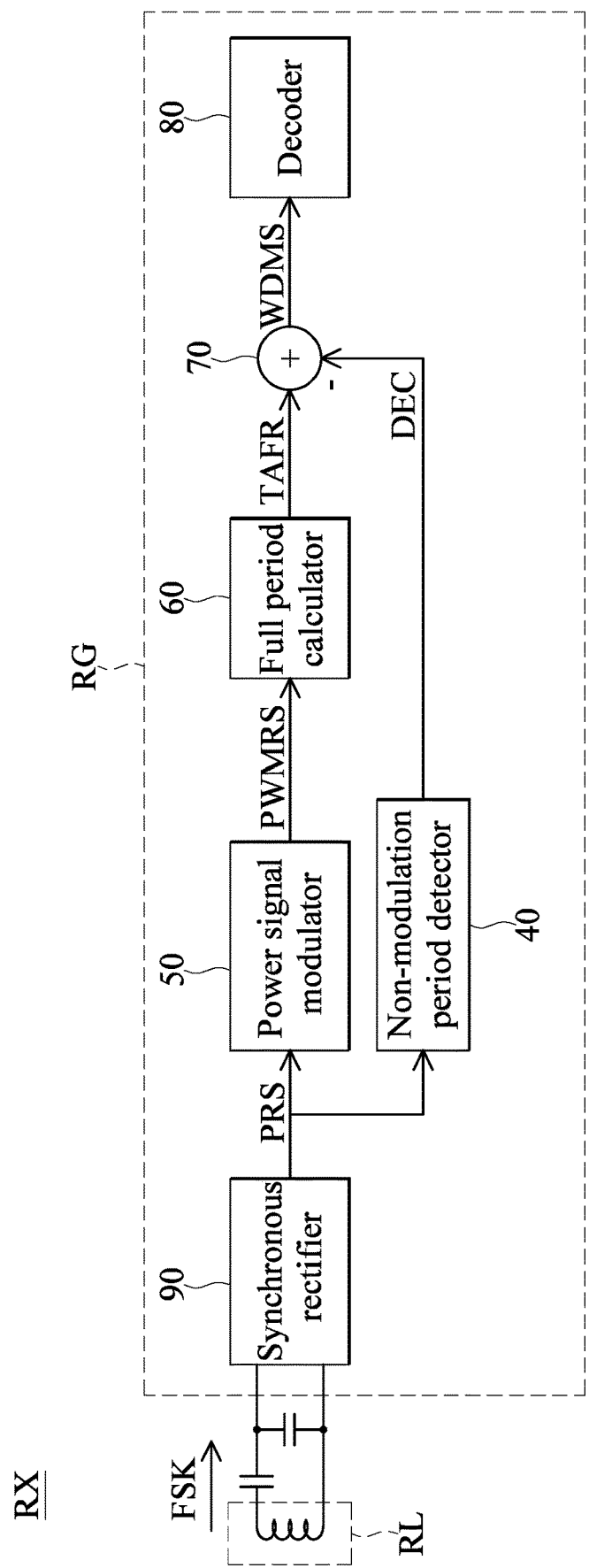
FIG. 3 is an internal circuit layout diagram of the power receiver of the system for demodulating the frequency shift keying signal according to a second embodiment of the present disclosure.

The amplitude shift keying signal generator RAG may generate the demodulated signal according to a modulated parameter of the pulse width modulated signal PWMS modulated from the power signal PS and the decoded undemodulated signal WDES. Alternatively, as shown in FIG. 3, the amplitude shift keying signal generator RAG generates the demodulated signal according to a modulated parameter of the pulse width modulated signal PWRMS modulated from a power rectified signal PRS and the decoded undemodulated signal WDES. The amplitude shift keying signal generator RAG may then adjust an amplitude of the demodulated signal to generate the amplitude shift keying signal ASK that is to be transmitted to the power receiver inductor RL.

Then, the power receiver inductor RL of the power receiver RX may be electromagnetically coupled with the power transmitter inductor TL of the power transmitter TX to respond the amplitude shift keying signal ASK to the power transmitter TX. The power transmitter inductor TL of the power transmitter TX may transmit the amplitude shift keying signal ASK from the power receiver inductor RL of the power receiver RX to the amplitude shift keying signal receiver TAR of the power transmitter TX.

Further, if necessary, the amplitude shift keying signal receiver TAR may determine whether the amplitude shift keying signal ASK is correct. Firstly, the amplitude shift keying signal receiver TAR receives the frequency shift keying signal FSK from the power signal generator TG Then, the amplitude shift keying signal receiver TAR determines whether the power signal PS of the frequency shift keying signal FSK is modulated to be equal to a modulated power signal included in the amplitude shift keying signal ASK indicated by the power modulation instruction message 112 by the power receiver RX. Alternatively, the amplitude shift keying signal receiver TAR transmits the amplitude shift keying signal ASK from the power transmitter inductor TL to the power signal generator TG The power signal generator TG performs the above-mentioned determination operation.

Reference is made to FIG. 3, which is an internal circuit layout diagram of the power receiver of the system for demodulating a frequency shift keying signal according to a second embodiment of the present disclosure. In the embodiment, the system for demodulating the frequency shift keying signal includes the power transmitter and the power receiver RX. The power receiver RX may be electromagnetically coupled to the power transmitter.

As shown in FIG. 3, the power receiver RX includes the power receiver inductor RL and the power modulation signal generator RG The power receiver inductor RL may be connected to the power modulation signal generator RG through a capacitor. The power modulation signal generator RG may include the non-modulation period detector 40, the power signal modulator 50, the full period calculator 60, the undemodulated signal generator 70, a decoder 80 and a synchronous rectifier 90.

Firstly, the power receiver inductor RL of the power receiver RX is electromagnetically coupled with the power transmitter so as to receive the frequency shift keying signal FSK from the power transmitter. In the embodiment, the frequency shift keying signal FSK includes the power signal PS and the power modulation instruction message 112. The power receiver RX then transmits the frequency shift keying signal FSK to the synchronous rectifier 90. For example, the synchronous rectifier 90 may be a half wave rectifier or a full wave rectifier. The synchronous rectifier 90 rectifies a waveform of the power signal PS of the frequency shift keying signal FSK to generate the power rectified signal PRS. The synchronous rectifier 90 then synchronously or asynchronously outputs the power rectified signal PRS to the power signal modulator 50 and the non-modulation period detector 40.

The power signal modulator 50 is configured to determine power modulated parameters indicated by the power modulation instruction message 112 of the frequency shift keying signal FSK. The power signal modulator 50 modulates a frequency or other parameters of the power rectified signal PRS according to the power modulated parameters so as to adjust the power of the power rectified signal PRS to generate a pulse width modulated signal PWMRS. The full period calculator 60 may then calculate a full period TAFR of the pulse width modulated signal PWMRS that is to be outputted to the undemodulated signal generator 70.

After or when the power signal modulator 50 or the full period calculator 60 performs the above-mentioned processes, the non-modulation period detector 40 may calculate the non-modulation period DEC of the power rectified signal PRS that is to be outputted to the undemodulated signal generator 70 within the sampling time.

The undemodulated signal generator 70 may be a subtractor. The undemodulated signal generator 70 is configured to subtract the non-modulation period DEC from the full period TAFR of the pulse width modulated signal PWMRS to obtain an undemodulated signal WDMS that is to be outputted to the decoder 80. The undemodulated signal generator 70 may generate a threshold according to a waveform parameter of the undemodulated signal WDMS or the undemodulated signal WDES shown in FIG. 2. For example, as shown in FIG. 4, a threshold TH of the undemodulated signal WDMS is an average value of a peak value and a valley value of the undemodulated signal WDMS, but the present disclosure is not limited thereto. In practice, the threshold of the undemodulated signal WDMS may be any value for the subsequent decoding operation.

The decoder 80 receives the undemodulated signal WDMS from the undemodulated signal generator 70 and decodes the undemodulated signal WDMS based on the threshold TH to obtain a demodulated signal DES. The demodulation signal DES may represent binary bit values. For example, the demodulation signal DES may have one or more bit values or bit streams.

Reference is made to FIG. 4, which is a signal waveform diagram of the system for demodulating the frequency shift keying signal according to a third embodiment of the present disclosure. As shown in FIG. 4, signals may be transmitted between the power transmitter TX and the power receiver RX. A time that the power transmitter TX waits for receiving a signal transmitted from the power receiver RX and a time that the power receiver RX waits for receiving a signal transmitted from the power transmitter TX are both the waiting time TR. The power transmitter TX transmits the frequency shift key signal FSK to the power receiver RX. After the power transmitter TX waits for the waiting time TR, the power receiver RX responds to the amplitude shift keying signal ASK to the power transmitter TX according to the frequency shift key signal FSK received from the power transmitter TX. The power transmitter TX receives the amplitude shift keying signal ASK from the power receiver RX. After the power receiver RX waits for the waiting time TR, the power transmitter TX responds the frequency shift key signal FSK corresponding to the amplitude shift keying signal ASK to the power receiver RX. For example, the waiting time TR is not shorter than 1 ms.

It is worth noting that the conventional FSK demodulation system usually does not perform any operation within the waiting time, in particular, the detection operation of the non-modulation period of the frequency shift keying signal. However, in the embodiment of the present disclosure, the power receiver RX detects the non-modulation period of the frequency shift keying signal FSK within the sampling time TDC of the waiting time TR. For example, the power receiver RX samples N pulse waves among a plurality of pulse waves of the frequency shift keying signal FSK, and calculates the non-modulation period of the sampled pulse waves of the frequency shift keying signal FSK.

The power receiver RX may rectify and modulate a frequency of the frequency shift keying signal FSK to generate the pulse width modulated signal PWMRS having the full period TAFR. The power receiver RX may subtract the non-modulation period such as 274 from the full period TAFR such as 285 of the pulse width modulation signal PWMRS to obtain the undemodulated signal WDES having a period TRD such 11. The power receiver RX may then calculate the threshold TH of the undemodulated signal WDES and decode the undemodulated signal WDES based on the threshold TH to obtain the demodulated signal DES. For example, the demodulation signal DES may include a Bi-phase Mark Code (BMC) or other suitable codes, but the present disclosure is not limited thereto.

Figure 5:
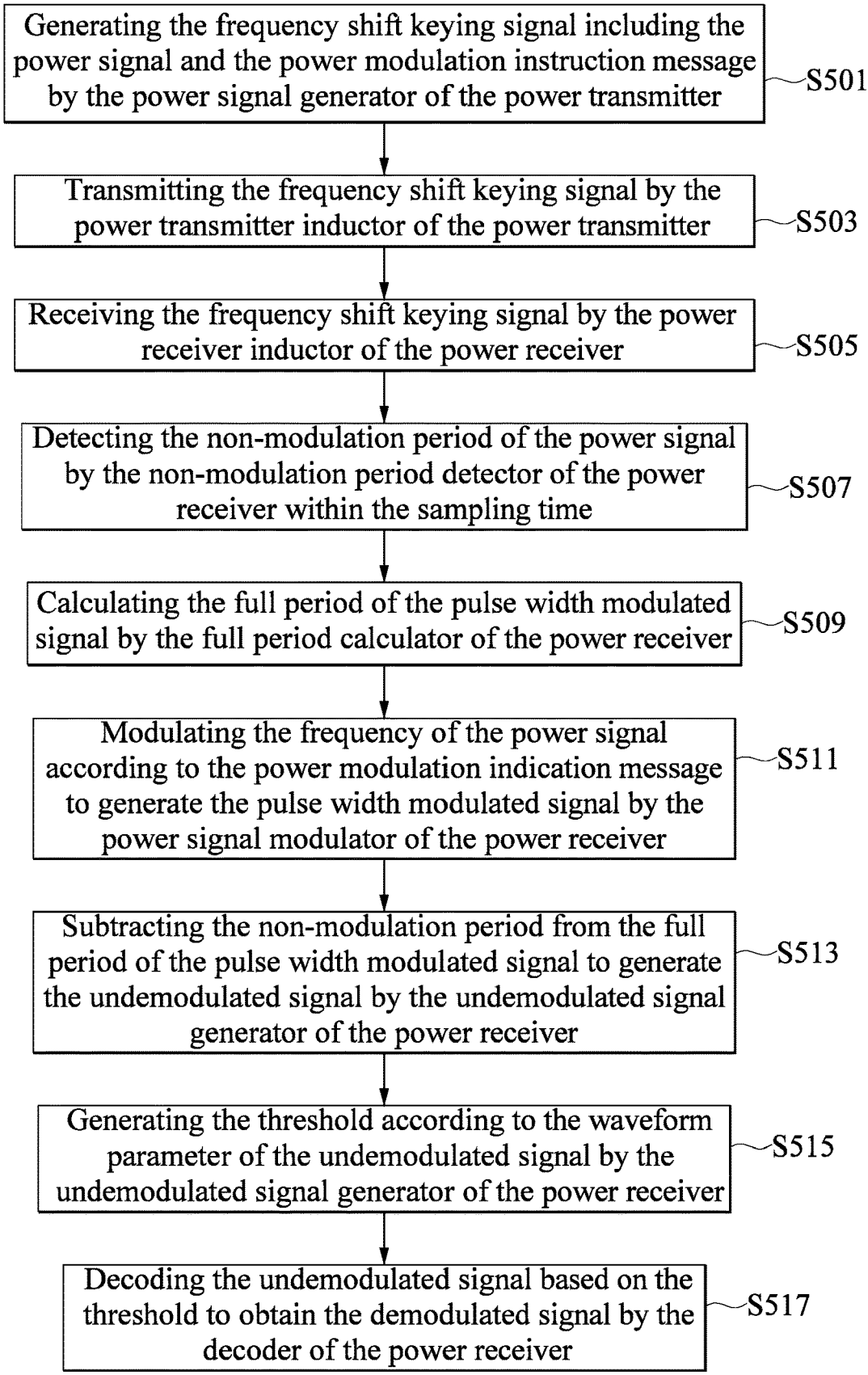
FIG. 5 is a flowchart diagram of a method for demodulating a frequency shift keying signal according to a fourth embodiment of the present disclosure.

Reference is made to FIG. 5, which is a flowchart diagram of a method for demodulating a frequency shift keying signal according to a fourth embodiment of the present disclosure. As shown in FIG. 5, in the embodiment, the method for demodulating the frequency shift keying signal includes the following steps S501 to S517, which are applicable for the above-mentioned system for demodulating the frequency shift keying signal. In steps S501 to S517, the power receiver demodulates the frequency shift keying signal from the power transmitter.

In step S501, the power signal generator of the power receiver generates the frequency shift keying signal including the power signal and the power modulation instruction message.

In step S503, the power transmitter inductor of the power transmitter transmits the frequency shift keying signal.

In step S505, the power receiver inductor of the power receiver receives the frequency shift keying signal.

In step S507, the non-modulation period detector of the power receiver detects the non-modulation period of the power signal within the sampling time.

In step S509, the full period calculator of the power receiver calculates the full period of the pulse width modulated signal.

In step S511, the power signal modulator of the power receiver modulates the frequency of the power signal according to the power modulation instruction message to generate the pulse width modulated signal.

In step S513, the undemodulated signal generator of the power receiver subtracts the non-modulation period from the full period of the pulse width modulated signal to generate the undemodulated signal.

In step S515, the undemodulated signal generator of the power receiver generates the threshold according to the waveform parameter of the undemodulated signal.

In step S517, the decoder of the power receiver decodes the undemodulated signal based on the threshold to obtain the demodulated signal. For example, the demodulated signal includes a Bi-phase Mark Code.

It should be understood that a sequence of steps described herein may be adjusted according to actual requirements, and the present disclosure is not limited to thereto. For example, in practice, the order of steps S507 and S509 may be exchanged with each other, or steps S507 and S509 may be simultaneously performed.

Figure 6:
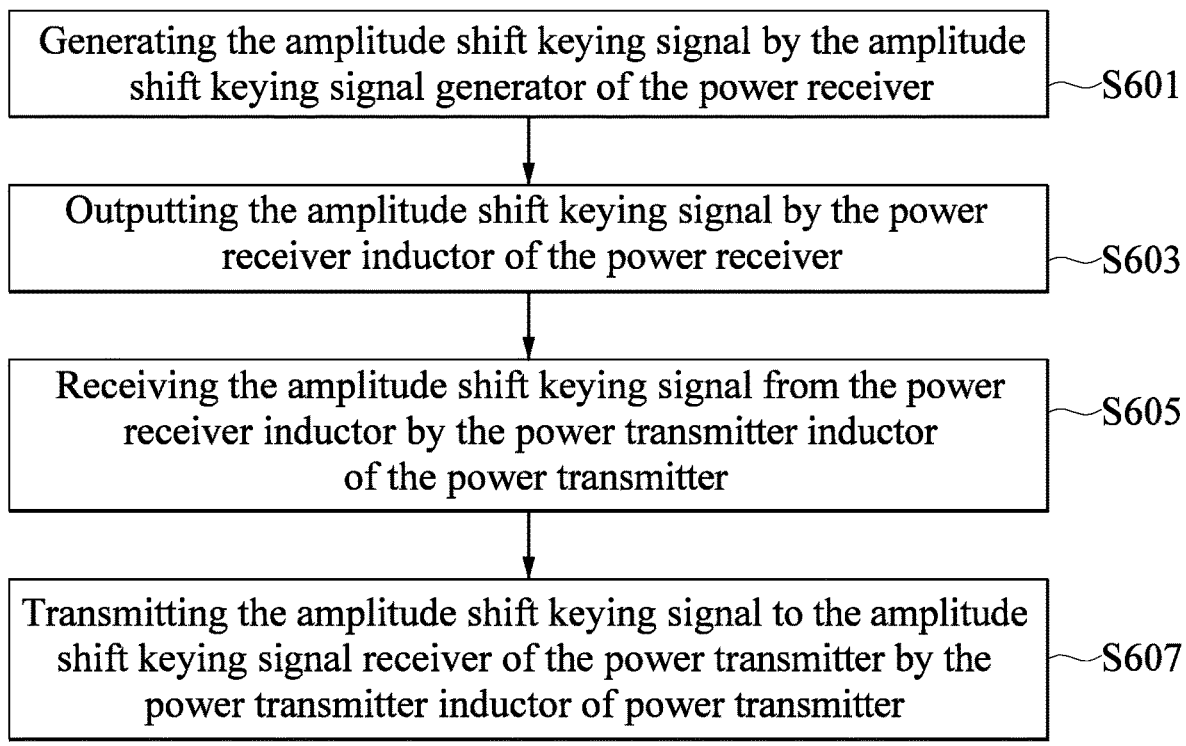
FIG. 6 is a flowchart diagram of a method for demodulating a frequency shift keying signal according to a fifth embodiment of the present disclosure.

Reference is made to FIG. 6, which is a flowchart diagram of a method for demodulating a frequency shift keying signal according to a fifth embodiment of the present disclosure. As shown in FIG. 6, in the embodiment, the method for demodulating the frequency shift keying signal includes the following steps S601 to S607 for the above-mentioned system for demodulating the frequency shift keying signal. After the demodulation program of the frequency shift keying signal is executed in steps S501 to S517, steps S601 to S617 are performed. In step S601 to S617, the power receiver responds the amplitude shift keying signal to the power transmitter.

In step S601, the power signal modulator of the power receiver adjusts the amplitude of the demodulated signal to generate the amplitude shift keying signal.

In step S603, the power receiver inductor of the power receiver outputs the amplitude shift keying signal.

In step S605, the power receiver inductor of the power transmitter receives the amplitude shift keying signal from the power receiver inductor.

In step S607, the power transmitter inductor of the power transmitter transmits the amplitude shift keying signal to the power signal generator of the power transmitter.

Figure 7:
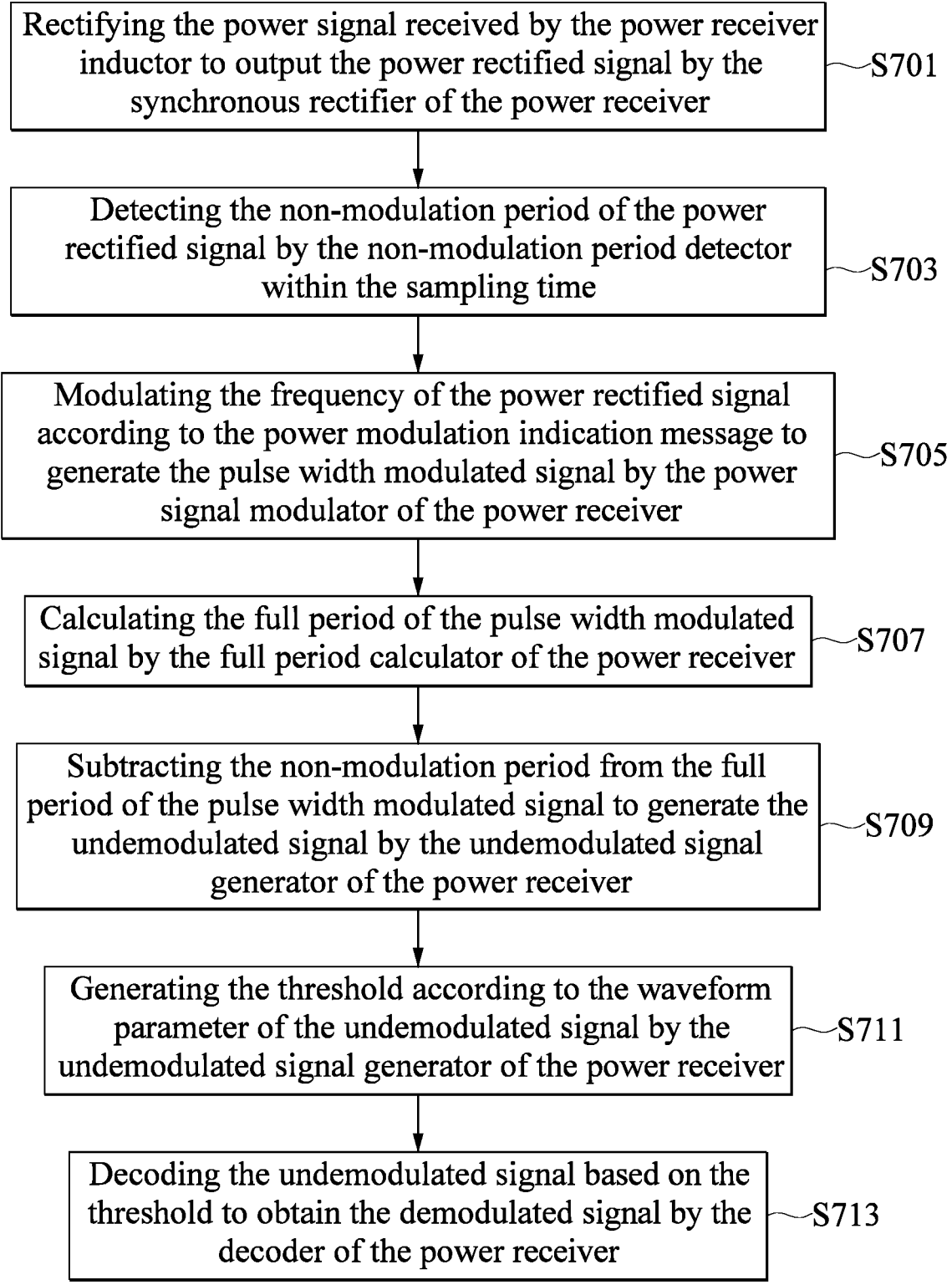
FIG. 7 is a flowchart diagram of a method for demodulating a frequency shift keying signal according to a sixth embodiment of the present disclosure.

Reference is made to FIG. 7, which is a flowchart diagram of a method for demodulating a frequency shift keying signal according to a sixth embodiment of the present disclosure. As shown in FIG. 7, in the embodiment, the method for demodulating the frequency shift keying signal includes the following steps S701 to S713 for the above-mentioned system for demodulating the frequency shift keying signal.

In step S701, the synchronous rectifier of the power receiver rectifies the power signal received by the power receiver inductor from the power transmitter to output the power rectified signal.

In step S703, the non-modulation period detector detects the non-modulation period of the power rectified signal within the sampling time.

In step S705, the power signal modulator of the power receiver modulates a frequency of the power rectified signal according to the power modulation instruction message to generate the pulse width modulated signal.

In step S707, the full period calculator of the power receiver calculates the full period of the pulse width modulated signal.

In step S709, the undemodulated signal generator of the power receiver subtracts the non-modulation period from the full period of the pulse width modulated signal to generate the undemodulated signal.

In step S711, the undemodulated signal generator of the power receiver generates the threshold according to the waveform parameter of the undemodulated signal.

In step S713, the decoder of the power receiver decodes the undemodulated signal based on the threshold to obtain the demodulated signal.

In summary, the present disclosure provides the system and method for demodulating the frequency shift keying signal. In detail, the power receiver modulates the frequency of the frequency shift keying signal received from the power transmitter so as to adjust the power to obtain the pulse width modulated signal. Then, the power receiver subtracts the non-modulation period of the non-modulated frequency shift keying signal from the full period of the pulse width modulated signal to obtain the undemodulated signal. In addition, the power receiver generates the threshold of the pulse wave of the undemodulated signal, and decodes the undemodulated signal based on the threshold. In this way, in comparison with a conventional demodulated system, when coils of the power transmitter and the power receiver are replaced with different power transmitters and power receivers, the present disclosure does not need to re-detect different coil parameter values of the new ones by an external equipment so as to reset a different threshold for decoding transmitted signals. Therefore, the present disclosure can effectively improve a mass production efficiency of the system.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A system for demodulating a frequency shift keying signal, comprising:
   a power transmitter including:
      a power signal generator configured to generate the frequency shift keying signal including a power signal and a power modulation instruction message; and
      a power transmitter inductor connected to the power signal generator and configured to transmit the frequency shift keying signal from the power signal generator; and
   a power receiver connected to the power transmitter and including:
      a power receiver inductor coupled to the power transmitter inductor and configured to receive the frequency shift keying signal and respond a power modulation response signal to the power transmitter inductor within a waiting time after receiving the frequency shift keying signal;
      a power modulation signal generator including:
         a non-modulation period detector connected to the power receiver inductor and configured to detect a non-modulation period of the power signal received by the power receiver inductor within a sampling time;

a power signal modulator connected to the power receiver inductor and configured to modulate the power signal to generate a pulse width modulated signal according to the power modulation instruction message;

a full period calculator connected to the power signal modulator and configured to calculate a full period of the pulse width modulated signal; and an undemodulated signal generator connected to the full period calculator and the non-modulation period detector and configured to subtract the non-modulation period from the full period of the pulse width modulated signal to generate an undemodulated signal.

2. The system of claim 1, wherein the power receiver further includes a decoder connected to the undemodulated signal generator;

the undemodulated signal generator is configured to generate a threshold according to a waveform parameter of the undemodulated signal;

the decoder is configured to decode the undemodulated signal based on the threshold to obtain a demodulated signal having one or more bit values;

the undemodulated signal generator is configured to output a power demodulated signal according to a modulated parameter and the one or more bit values of the demodulated signal;

the power receiver inductor is configured to respond the power demodulated signal to the power transmitter after the waiting time;

the power transmitter inductor of the power transmitter receives the power demodulated signal and then transmits the power demodulated signal to the power signal generator.

3. The system of claim 1, wherein the power receiver further includes a synchronous rectifier connected to the power receiver inductor and the power signal modulator, and configured to rectify the power signal received by the power receiver inductor to output a power rectified signal;

the non-modulation period detector is configured to detect the non-modulation period of the power rectified signal within the sampling time;

the power signal modulator is configured to modulate a frequency of the power rectified signal to generate the pulse width modulated signal according to the power modulation instruction message;

the full period calculator calculates the full period of the pulse width modulated signal;

the undemodulated signal generator is configured to subtract the non-modulation period from the full period of the pulse width modulated signal to obtain the undemodulated signal.

4. The system of claim 1, wherein the undemodulated signal generator includes a subtractor.

5. The system of claim 1, wherein the waiting time is not shorter than 1 ms.

6. A method for demodulating a frequency shift keying signal, comprising the following steps:

generating the frequency shift keying signal including a power signal and a power modulation instruction message by a power signal generator of a power transmitter;

transmitting the frequency shift keying signal received from the power signal generator by a power transmitter inductor of the power transmitter;

receiving the frequency shift keying signal by a power receiver inductor of a power receiver;

detecting a non-modulation period of the power signal received by the power receiver inductor within a sampling time by a non-modulation period detector of the power receiver;

modulating the power signal to generate a pulse width modulated signal according to the power modulation instruction message by a power signal modulator of the power receiver;

calculating a full period of the pulse width modulated signal by a full period calculator of the power receiver; and subtracting the non-modulation period from the full period of the pulse width modulated signal to generate an undemodulated signal by an undemodulated signal generator of the power receiver.

7. The method of claim 6, further comprising the following steps:

generating a threshold according to a waveform parameter of the undemodulated signal after the sampling time by the undemodulated signal generator of the power receiver;

decoding the undemodulated signal based on the threshold to obtain a demodulated signal having one or more bit values by a decoder of the power receiver;

generating a demodulated response message according to a modulated parameter and the one or more bit values of the demodulated signal, and generating a power demodulated signal according to the demodulated signal and the demodulated response message by the undemodulated signal generator of the power receiver;

outputting the power demodulated signal after the waiting time by the power receiver inductor of the power receiver; and transmitting the power demodulated signal to the power signal generator from the power receiver inductor by the power transmitter inductor of the power transmitter.

8. The method of claim 6, further comprising the following steps:

rectifying the power signal received by the power receiver inductor to output a power rectified signal by a synchronous rectifier of the power receiver;

detecting the non-modulation period of the power rectified signal within the sampling time by the non-modulation period detector;

modulating a frequency of the power rectified signal according to the power modulation instruction message to generate the pulse width modulated signal by the power signal modulator of the power receiver;

calculating the full period of the pulse width modulated signal by the full period calculator of the power receiver; and subtracting the non-modulation period from the full period of the pulse width modulated signal to obtain the undemodulated signal by the undemodulated signal generator of the power receiver.

9. The method of claim 6, further comprising the following step:

subtracting the non-modulation period from the full period of the pulse width modulated signal to generate the undemodulated signal by a subtractor of the undemodulated signal generator.

* * * * *